(12) United States Patent
Masten et al.

(10) Patent No.: US 9,167,742 B2
(45) Date of Patent: Oct. 27, 2015

(54) METHOD AND APPARATUS FOR PLANTING SEED CROPS

(71) Applicants: Billy R. Masten, Shallowater, TX (US); Gaylen R. Stukey, Plainview, TX (US); Leland P. Stukey, Plainview, TX (US)

(72) Inventors: Billy R. Masten, Shallowater, TX (US); Gaylen R. Stukey, Plainview, TX (US); Leland P. Stukey, Plainview, TX (US)

( * ) Notice: Subject to any disclaimer, the term of this patent is extended or adjusted under 35 U.S.C. 154(b) by 71 days.

(21) Appl. No.: 14/058,414

(22) Filed: Oct. 21, 2013

(65) Prior Publication Data
US 2015/0107503 A1  Apr. 23, 2015

(51) Int. Cl.
  A01B 49/06  (2006.01)
  A01B 49/02  (2006.01)
  A01B 79/00  (2006.01)

(52) U.S. Cl.
  CPC ............. *A01B 79/005* (2013.01); *A01B 49/027* (2013.01); *A01B 49/06* (2013.01)

(58) Field of Classification Search
  CPC .... A01B 79/005; A01B 79/00; A01B 49/027; A01B 49/02; A01B 49/00; A01B 49/06; A01B 49/04
  See application file for complete search history.

(56) References Cited

U.S. PATENT DOCUMENTS

| | | | |
|---|---|---|---|
| 5,038,040 | A | 8/1991 | Funk et al. |
| 5,524,560 | A | 6/1996 | Carter |
| 5,841,282 | A | 11/1998 | Christy et al. |
| 5,847,568 | A | 12/1998 | Stashkiw et al. |
| 8,017,923 | B2 | 9/2011 | Inoue et al. |
| 8,204,689 | B2 | 6/2012 | Christy et al. |
| 2011/0102798 | A1 | 5/2011 | Holland |
| 2013/0112122 | A1* | 5/2013 | Blomme et al. ............... 111/149 |

OTHER PUBLICATIONS

Brochure, John Deere "MaxEmerge® Plus Planters," 20 pp.; Publication No. EPN 1750 E; Aug. 5, 2011.

* cited by examiner

*Primary Examiner* — Christopher J Novosad
(74) *Attorney, Agent, or Firm* — Whitaker Chalk Swindle & Schwartz PLLC; Stephen S. Mosher

(57) ABSTRACT

A process and apparatus for controlling the moisture content of soil deposited in a furrow during seed planting comprises tilling the soil to an adjustable depth to expose soil corresponding to a reference soil moisture setting, selecting covering soil from the exposed soil having a moisture content that matches the moisture content of the reference soil moisture setting, and depositing the covering soil over the seed.

19 Claims, 10 Drawing Sheets

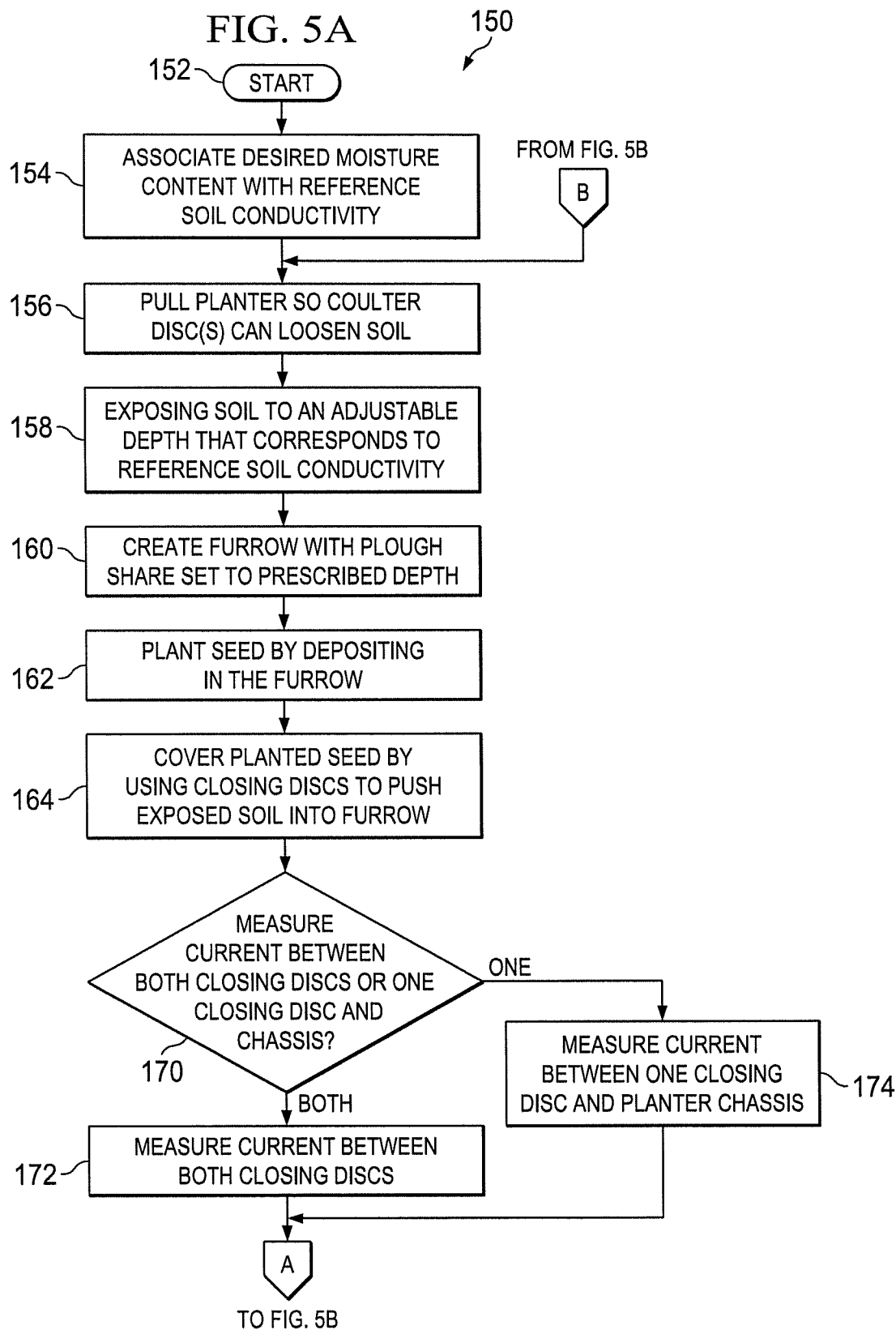

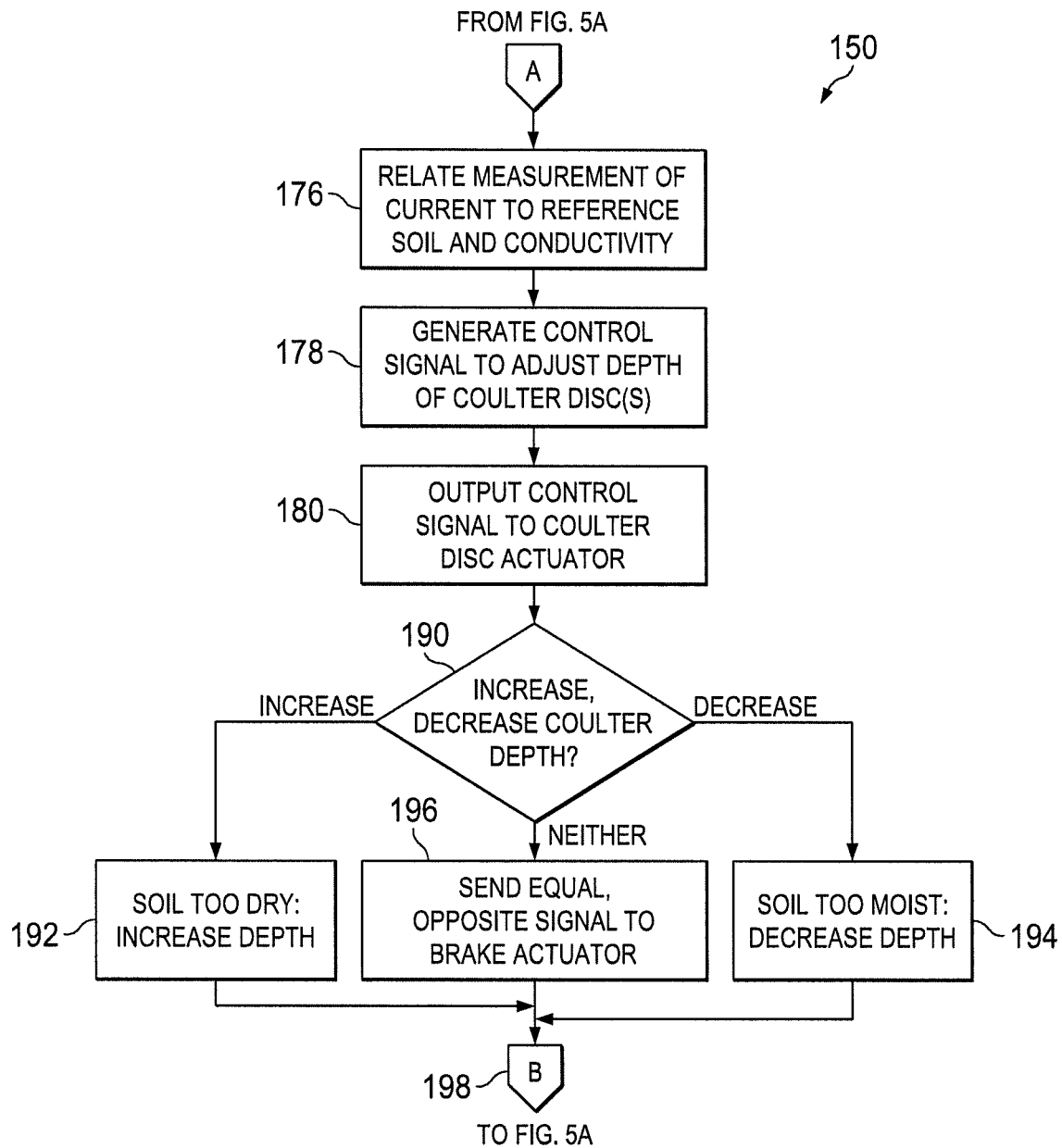

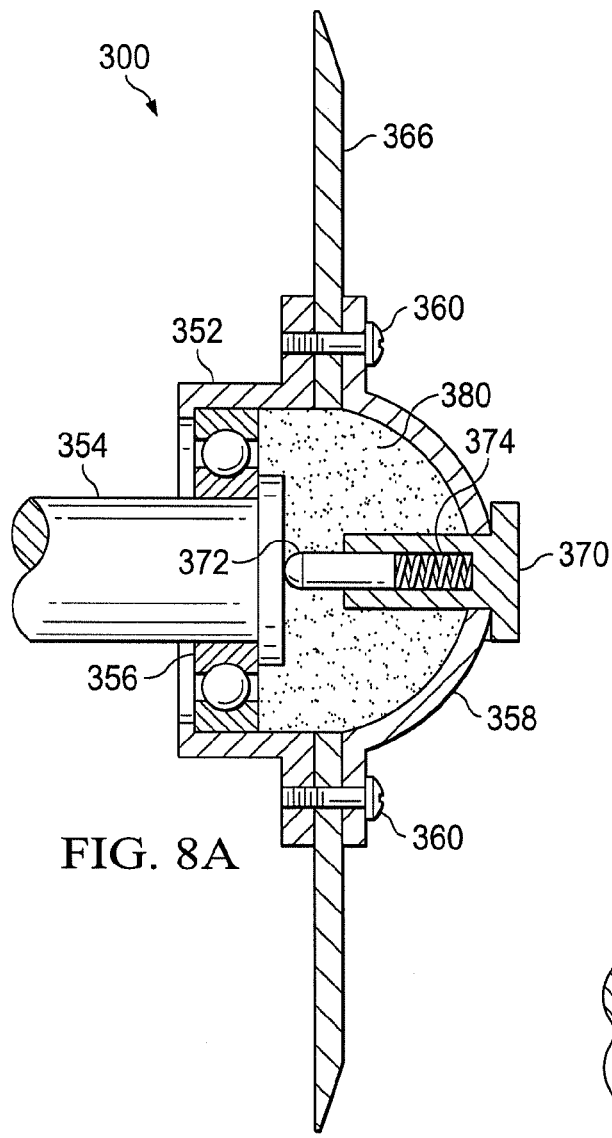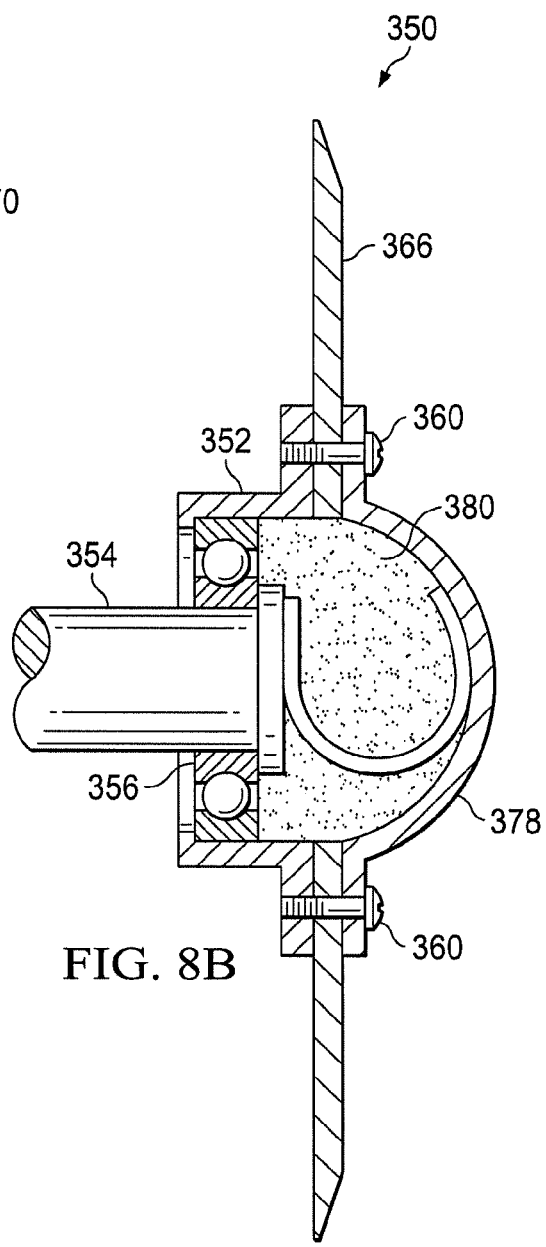
FIG. 8A
FIG. 8B

METHOD AND APPARATUS FOR PLANTING SEED CROPS

BACKGROUND OF THE INVENTION

1. Field of the Invention

The present invention generally relates to implements for use in agriculture and more particularly to implements for planting seed crops.

2. Background of the Invention and Description of the Prior Art

Motorized or mobile implements for planting seed are known in the prior art. One example is the "Vacumeter" planter implement manufactured by Deere & Company under the John Deere brand name. Each unit is a single chassis that includes devices for surface preparation, discs for forming a furrow, a seed dispenser for depositing the seeds into the furrow, closing wheels to close the furrow over the seeds, and a press wheel for "firming" the soil into the furrow so that the seeds are in close contact with the soil. The chassis, which is equipped with wheels, is typically towed by a tractor to provide preparation of the furrow, planting the seeds, and closing the furrow all by a single machine. Multiple planter units of this type may be ganged together to plant seed in multiple parallel rows. A disadvantage of this type of planter is that it offers no provision for planting the seed in soil having a specified moisture content that is favorable for seed germination.

U.S. Pat. No. 5,524,560 issued to Carter describes a "System for Controlling Vertical Displacement of Agricultural Implements into the Soil." The system operates to "maintain the depth of a planter (or tiller) at a soil depth of optimal moisture content" in response to the output of a soil resistivity sensor. The system eschews the use of planter structures as electrodes, but includes other structural features said to improve the accuracy of the soil resistivity measurement. It is limited to using the soil resistivity measurement to control the vertical displacement of the tiller implement corresponding to the moisture content indicated by the resistivity measurement. A disadvantage of this system is that it lacks the ability to control the moisture content of the soil used to cover the seed deposited into a furrow. Further, the system of Carter seeks a moisture level regardless of the depth it must go to reach soil having a suitable moisture content. Thus, the depth into which the seed is deposited may be the wrong depth for that type of seed.

In U.S. Pat. No. 5,841,282 issued to Christy et al., a "Device for Measuring Soil Conductivity" is disclosed that develops a soil conductivity measurement from voltage and current measurements taken by first and second pairs of coulters used as electrodes. The system is adapted to provide data on topsoil texture and depth, and also soil conductivity at two or more soil depths. The system is used to gather and map accurate data about soil properties but does not apply the measurements directly during its operation to optimize planting in response to parameters such as soil moisture content.

U.S. Pat. No. 8,204,689, also issued to Christy et al., for a "Mobile Soil Mapping System for Collecting Reflectance Measurements" describes optical apparatus for collecting spectroscopic measurements of soil properties in a field, specifically to determine soil carbon levels and other related properties. Again, the disclosed system is a data gathering and mapping system that is not adapted to directly using such data to control the planting of seeds in a field.

In the planting of particular types of seed it is desired to plant the seed so that it is placed in soil having the optimum moisture content for germination. Planting the seeds at some depth corresponding to a desired moisture content is only an approximation, and may not be a desirable depth for other reasons. Different types of seed thrive during the germination phase at differing depths and differing moisture content, often depending on the particular variety of seeds and the type of soil. It would be preferred that seeds could be planted at their recommended depth for the seed variety under local conditions and be provided soil at that depth that had the preferred moisture content. The foregoing systems are unable to accomplish this in real time during the planting operation.

SUMMARY OF THE INVENTION

Accordingly, a process is provided for controlling the moisture content of soil deposited in a furrow during seed planting using a planter, comprising the steps of initially tilling the soil to an adjustable depth to expose soil corresponding to a reference soil moisture setting; selecting covering soil from the exposed soil having a moisture content that matches the moisture content of the reference soil moisture setting; and depositing the covering soil into the furrow over the seed.

In another embodiment, useable during operation of a planter implement having at least one coulter disc, an adjustable ploughshare, a seed dispensing device, and first and second furrow closing discs disposed along a common chassis, an improved process is provided for planting seed, comprising the steps of associating a desired soil moisture content for germinating seed with a reference soil conductivity; loosening soil to an adjustable depth with the at least one coulter disc; creating a furrow to a preset planting depth with the ploughshare and planting the seed in the furrow; measuring the conductivity of the soil between the first and second furrow closing discs; controlling the adjustable depth corresponding to the reference soil conductivity; and covering seed planted in the furrow with soil from the loosening step having the desired moisture content.

In another embodiment an apparatus is provided for covering seed dispensed into a furrow with soil selected according to its moisture content, comprising a planter chassis and a coulter adjustable to excavate a soil surface along a path to a depth corresponding to a soil moisture setting and depositing the excavated soil adjacent the path; a control circuit responsive to the soil moisture setting for adjusting the coulter to the depth; and a covering member assembly for urging soil excavated by the coulter and having a soil moisture content approximately equal to the soil moisture setting over the seed; wherein the coulter, control circuit, and covering member assembly are supported by the planter chassis.

BRIEF DESCRIPTION OF THE DRAWINGS

FIG. 5A illustrates a first portion of a flow chart for the operation of the embodiment of the invention depicted in FIGS. 1-4;

FIG. 5B illustrates a second portion of the flow chart for the operation of the embodiment of the invention in FIGS. 1-4;

FIGS. 8A and 8B illustrate first and second embodiments respectively of coupling mechanisms for connecting the electrode leads of the sense circuit of FIG. 3 or 4 to discs of the planter implement of FIGS. 1 and 2;

DETAILED DESCRIPTION OF THE INVENTION

Figure 1:
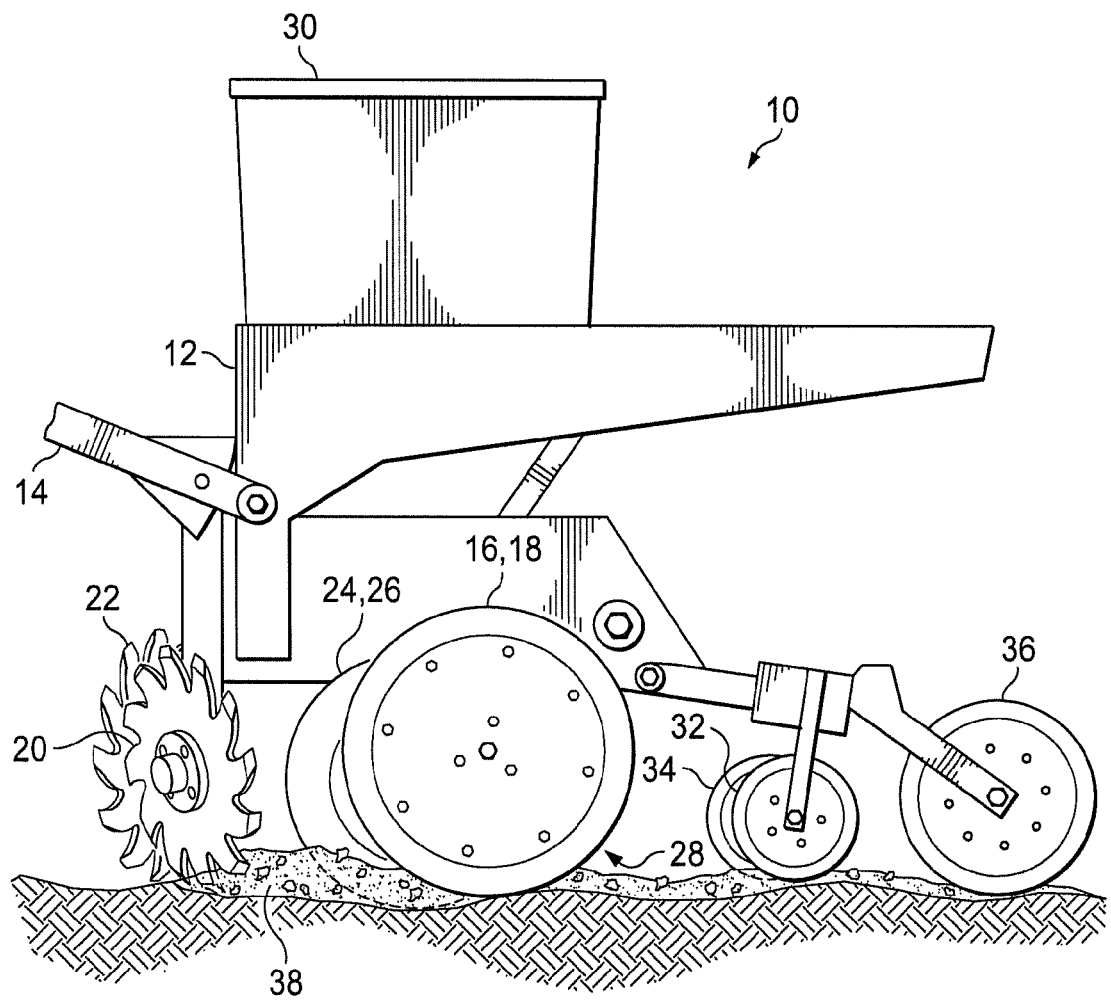
FIG. 1 illustrates a side view of a lower portion of a planter implement for use with one embodiment of the present invention and shown with the forward end of the planter oriented to the left in the figure.

In the planting of particular types of seed it is desired to plant the seed so that it is placed in soil having the optimum moisture content for germination. Planting the seeds at a depth corresponding to a desired moisture content, without accounting for other factors important for proper germination, is usually only an approximation. Different types of seed thrive during the germination phase at differing depths and differing moisture content, often depending on the particular variety of seed and the type of soil. For example, the planting depth for corn is generally about two inches. For soybeans, which are sensitive to both depth and moisture, one to 1½ inches is recommended. For sorghum, one inch in heavy soil to 1½ or 2 inches in sandy soil. For wheat, the depth recommendation is 1 inch to 2 inches, depending on the variety. Thus, it is preferred, and has been found more effective that seeds be planted at their recommended depth, taking into account at least local conditions, recommended planting time, the type of soil and the variety of seed, and then provided with the preferred moisture content.

In this description a representative planter is a wheeled implement towed behind a tractor. The planter combines features of a plough and a seed dispensing mechanism. Typically a pair of discs, which may be set at an angle to each other or equipped with cutting tines or teeth, are used as a coulter—the opening disc instrument that first breaks up the surface of the soil, clears away debris, etc. to initially till the soil. Other coulters may be a single disc that is shaped to loosen and expose the soil as it rotates during the forward motion of the planter. The coulter disc or discs are followed by the ploughshare instrument, usually but not always another pair of discs adapted to cutting into the loosened soil to produce a furrow of the prescribed shape and depth in which the seed is to be planted. As the furrow is produced a seed dispensing device releases the seed into the furrow at a prescribed rate. It is important to note that the soil, the furrow produced by the planter, the seed dispensed into the furrow by the planter, and the tractor that pulls the planter implement along the furrow do not form part of the invention.

Following the ploughshare and seed dispensing device may be a third device usually a pair of discs called closing discs that are positioned into the soil alongside the furrow and adapted to pushing excavated soil from the ploughing step back over and into the furrow, thereby covering the seed dispensed into the furrow. Finally, a press wheel such as a broad, light-weight tire may follow along over the covered furrow to gently pack the soil over the furrow. Each planter may typically have a hopper for the seeds and a control mechanism for releasing the seeds into the furrow. Such planters may preferably include adjustment of the furrow depth from at least a fraction of an inch to several inches by varying the set height of the ploughshare. Planters of this type may be ganged together and pulled as a ganged or multiple-row unit to plant seeds in multiple rows simultaneously.

The present invention achieves an advancement in the state of the art by modifying a planter such as described above with apparatus to measure the soil conductivity—an indication of the moisture content of the soil—during the planting operation. This measurement provides a gauge of the moisture content of the soil that will be used to cover the seed after the seed is deposited into the furrow. In general, the moisture content of the soil is lowest at the surface and increases with the depth of the furrow that will be formed for planting the soil. The measurement of the soil conductivity is used as a control signal to adjust the cutting depth of the coulter disc or discs at the forward end of the planter. If the conductivity measurement indicates dry soil at the location of the seed, the coulter disc or discs are adjusted to cut more deeply into the soil to excavate soil having a greater moisture content for the soil that will be used to fill in the furrow after the seed is deposited into the furrow. If, on the other hand, the conductivity measurement indicates that the soil moisture is relatively high for the particular seed being planted, then the coulter disc or discs are adjusted to cut less deeply into the surface of the soil to excavate soil having a lesser moisture content for the soil that will be used to fill in the furrow. The invention, in addition to providing a furrow of the proper depth, thus also provides for covering the seeds with soil having the most favorable moisture content for healthy germination.

In one embodiment the soil conductivity may be measured by connecting a sensing circuit to measure the current flow between two separated but adjacent (i.e., side-by-side) discs of the planter, such as the two closing discs. The measured or sensed current indicative of the soil conductivity is directly related to the resistance of the soil measured between the discs as they cut into the soil. The higher the resistance, and the lower the current, the dryer the soil. Conversely, the lower the resistance, and the higher the current, the more moist or wet is the soil. The measured resistance may be correlated with the desired moisture content as discussed in the following paragraph. The measurement is used to generate a control signal for adjusting the depth to which the coulter excavates or breaks up the soil in preparation for creating a furrow to receive the seeds. The soil thus loosened and selected for its moisture content will be used to cover the planted seeds, thus providing the desired moisture content for optimum germination.

The correlation between soil moisture content and the measured resistance between the electrodes may be described as follows. Soil moisture content is proportional to the electrical conductivity of the soil. Conductivity C is the reciprocal of the resistivity $\mathcal{R}$ of the sample of interest. Resistivity $\mathcal{R}$ is defined by (RA/l) where R=V/I by Ohm's Law, A=cross sectional area of the sample and l=the length of the sample. Thus conductivity $\mathcal{C}$=I(l/V×A) where I=current in the sample measured by the sensor circuit between the electrodes (32, 34), V=voltage applied across the electrodes, and l and A are the dimensions of the sample, which is the path through the soil between the electrodes. In the embodiment of the invention described herein, the path through the soil passes from one electrode to the other, and may include the soil under the furrow created by the ploughshare discs as well as the loosened soil that is being pushed back over the furrow by the closing discs. The desired moisture content for given or expected planting situations can be correlated by experiment with the range of conductivities and used to determine the constant parameters of the sensor circuit.

The exemplary planter depicted in FIG. 1 and described in the examples below has three pairs of discs: the coulter discs at the forward end, the ploughshare discs that follow the coulter discs, and a pair of closing or covering discs at the rearward end of the planter. The coulter discs are the toothed discs that appear to the left in FIG. 1. In a preferred embodiment the electrode leads of the sensing circuit are connected to each one of the closing or covering discs, at least one of which must be isolated from the chassis of the planter. In embodiments used on planters that are ganged together for planting multiple rows simultaneously it may be necessary to electrically isolate both of the discs that are connected as electrodes for the sensing circuit to minimize the influence of the soil in one row upon the current measurement in an adjacent row. The electrode leads may, in some embodiments, be connected to the pair of coulter discs or the pair of ploughshare discs. The resistance of the soil "$R_{soil}$" in contact with the pair of discs connected to the electrode leads forms a part of the sense circuit. When a voltage is connected to one of the electrodes and the circuit ground is connected to the other electrode, a current will flow in the resistance $R_{soil}$. $R_{soil}$ represents the electrical resistance of the path through the soil taken by the applied current. This is the current that is measured by the sense circuit. In the present example, $R_{soil}$ varies generally within the range of 500 Ohms for moist soil to 5000 Ohms for dry soil. For operation with a 12 Volt power supply, the typical current measured by the sensor circuit would be expected to be about 24 to 2.4 milliAmperes (mA) respectively. However, this example is intended to be illustrative and not intended to be limiting for this or other similar applications of the present invention.

In a preferred embodiment the soil conductivity is measured by sensing the current flow between the two closing discs that do double duty as the electrodes of the sensing circuit when they are pushing the loosened, moist soil back over the furrow and the seeds. Use of the two closing (covering) discs is preferred because they are located closest to the seeds as they are planted and the measured resistance will correspond most closely with the needed moisture content. As mentioned above, the coulter (opening) discs cut into the soil surface to loosen the soil and expose to soil to a depth such that the moisture content is appropriate for the seed being planted. The depth of the cut may be controlled by a control circuit that converts the current measurement to a conductivity value and uses it to develop a control signal. The control signal is fed to a driver circuit that delivers the operating current to an actuator such as a DC gear motor mounted on the planter. The gear motor drives a jack screw attached to the frame supporting the coulter discs. Turning the motor shaft—and the screw—in one direction raises the coulter discs to produce a shallower cut into the soil surface; turning the screw in the opposite direction causes the coulter discs to cut more deeply into the surface of the soil.

When the correct moisture content is reached, the control circuit signals the motor to stop by sending identical control signals of opposite polarity to the DC gear motor. This step provides a braking action of the gear motor that maintains the coulter discs' depth at a stable level until the conductivity measurement between the closing discs indicates that soil of a different moisture content is required. Persons skilled in the art will understand that other kinds of actuators may be used to raise or lower the cutting height of the coulter discs, thus adjusting the depth of the cut into the surface of the soil. For example, various mechanical arrangements or linkages may be used to provide the required vertical motion of the coulter discs. The linkages may be operated by electric or hydraulic motors controlled in response to drive signals from the control circuit.

The control circuit may be implemented as a discrete analog circuit or as a microcontroller circuit operated by programmed instruction, either of which are well known in the art. In the examples described below to illustrate the operation, the sensed current flowing in the electrodes is converted to a voltage that is compared with a reference voltage corresponding to the desired moisture content. Persons skilled in the art can readily design the simple circuit needed to control the planter as described herein. An example of an analog circuit will be described to illustrate the basic functions needed. If additional operational features are needed, a microcontroller may be used. Both approaches will be described.

It is important to note that the invention, unlike the prior art, does not regulate the depth of the furrow in response to the conductivity measurement; that parameter is preset on the planter by an appropriate adjustment of the height of the ploughshare discs. Rather, the invention uses a reference soil conductivity or moisture level, by way of a current measurement, for the particular seed to determine whether the soil used to fill in the furrow in contact with the seed has the correct amount of moisture in it. The moisture level is adjusted by instructing the coulter discs to expose the soil to a depth where the moisture content is the same as the desired control reference level. This soil, thus exposed, is used to cover the seed(s) after the planting step. As will be described, the depth of the furrow is created by other elements of the planter (the ploughshare discs) than the ones used to expose soil of the correct moisture content (the coulter discs) or the ones used to cover the seeds (the closing discs) after they are deposited or dispensed into the furrow.

FIG. 1 illustrates a side view of a lower portion of a planter implement for use with one embodiment of the present invention. The planter 10 is oriented in the figure with the leading end 14, which is typically hooked to a tractor, at the left side of the drawing. Principal components important to this description include first and second support wheels 16, 18 (support wheel 18, directly behind support wheel 16, is not visible in this view); first and second coulter discs 20, 22, first and second plowshare discs 24, 26 (plowshare disc 26, directly behind the first plowshare disc 24, is not visible in this view); first and second closing discs 32, 34; and a packing wheel 36. The closing discs 32, 34 may also be called the covering discs 32, 34, to identify them with their function. The support wheels 16, 18 are positioned astride a furrow to be prepared for the seeds. Further, positioned between the support wheels 16, 18 just aft of the ploughshare discs 24, 26 is a seed dispenser 28 for depositing the seeds, released into the furrow prepared by the planter 10 according to a predetermined rate.

The coulter discs 20, 22, which may be set at an angle to each other and may be equipped with cutting tines or teeth, are the opening discs used to break up the surface of the soil, clear away debris, etc. to initially till the soil, resulting in the loosened or excavated soil 38 shown in FIG. 1. In other applications a coulter may be a single disc that is shaped to loosen and expose the soil as it rotates during the forward motion of the planter. The coulter disc or discs 20, 22 are followed by the ploughshare discs 24, 26 that are adapted to cutting into the loosened soil to produce a furrow of the prescribed shape and depth in which the seed is to be planted. As the furrow is produced the seed dispenser 28 releases the seed into the furrow at the prescribed rate. Following the ploughshare discs 24, 26 and the seed dispenser 28 may be a third pair of discs called the closing or covering discs 32, 34 that are positioned into the soil alongside the furrow and adapted to pushing excavated soil from the ploughing step back over and into the furrow. The closing discs 32, 34 may form one example of a covering member assembly, which may use one or more rotating or non-rotating members to urge the loosened soil excavated by the coulter back into or over the furrow to cover the seeds.

Finally, a packing wheel 36 (or, alternatively, a press wheel 36) such as a broad, light-weight tire may follow along over the covered furrow to gently pack the soil over the furrow. Each planter 10 may typically have a hopper 30 for containing the bulk seeds to be dispensed and a control mechanism (not shown) for releasing the seeds into the furrow. Such planters 10 may preferably include adjustment of the furrow depth from at least a fraction of an inch to several inches by varying the set height of the ploughshare. This adjustment may be made by, for example, a lever (not shown) disposed on the frame or chassis 12 of the planter 10 that sets the relationship between the ploughshare discs 24, 26 and the support wheels 16, 18. Planters of this type may also be ganged together and pulled as a ganged unit to plant seeds in multiple parallel rows simultaneously.

Figure 2:
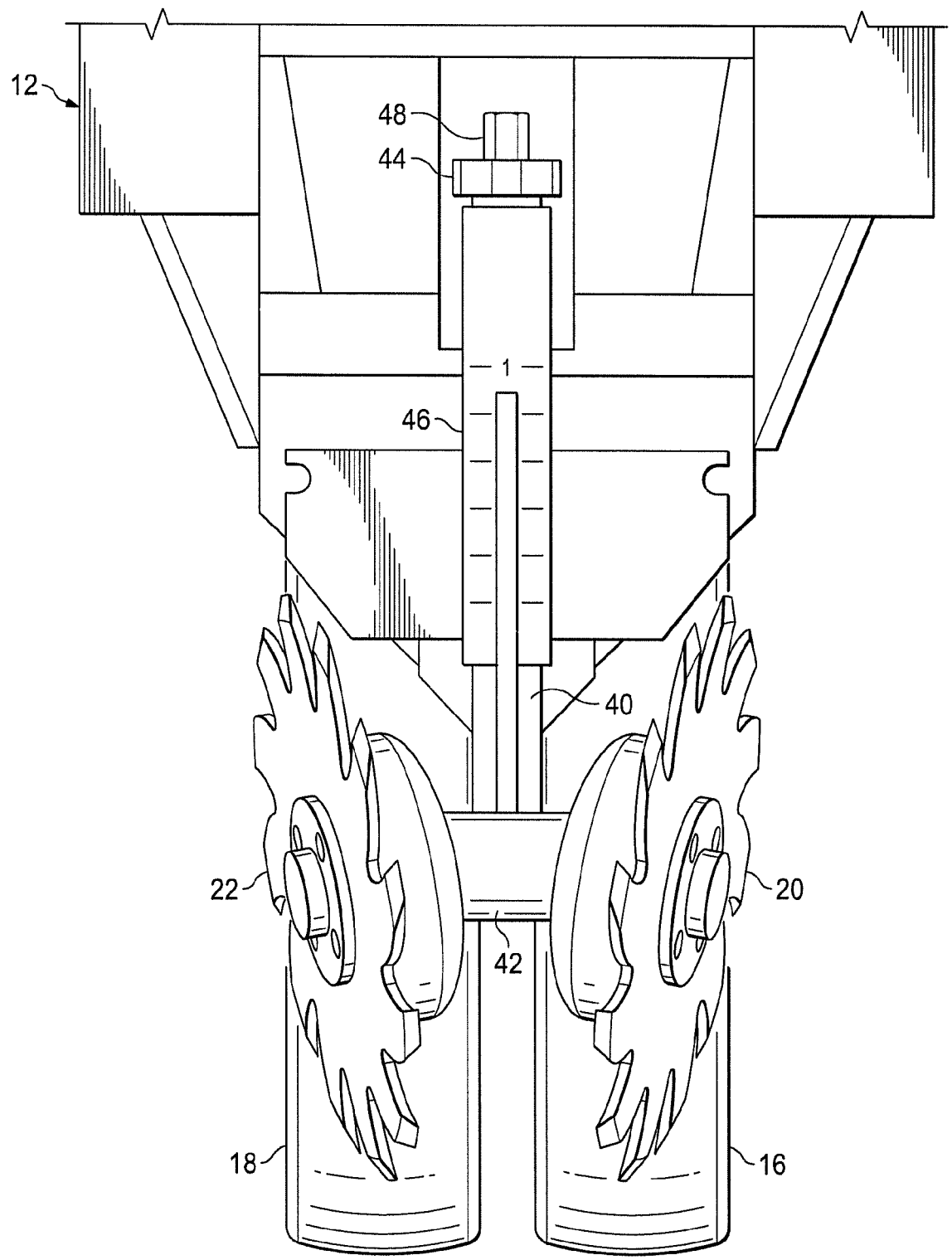
FIG. 2 illustrates a front view of the planter of FIG. 1 depicting one embodiment of a control mechanism of the present invention.

FIG. 2 illustrates a front view of the planter of FIG. 1 depicting one embodiment of a control mechanism of the present invention, showing a front view of the leading end 14 of the planter 10 of FIG. 1. Visible in this leading end view are the first and second coulter discs 20, 22 positioned just in front of the first and second support wheels 16, 18. The coulter disks 20, 22 in this embodiment are shown as tined or toothed discs to facilitate loosening the surface soil in preparation for forming the furrow as the planter 10 is pulled along by a tractor. Also shown in FIG. 2 is the adjustment mechanism or jacking device 40 (also called an actuator 40 or machine screw 40) for regulating the depth of the cut that the coulter discs 20, 22 make into the surface of the soil to loosen it for the ploughshare discs 24, 26. A height indicator 46 may be included on the planter 10 to indicate the relative position of the adjustable depth of the coulter discs.

The jacking device 40 may be a motor-driven linear actuator having a machine screw 40 attached at its lower end to the coulter support 42 (which is an axle and hub assembly for the coulter discs 20, 22 that is not shown in this view) located between the coulter discs 20, 22. The upper end of the actuator screw 40 may be passed through a threaded nut 44 attached to the frame or chassis 12 of the planter 10. At the very top end of the machine screw 40 may be a hex adjustment head 48 for turning the machine screw 40. In this embodiment the adjustment head 48 may be turned by a hex wrench socket (not shown). As will be described, the hex wrench socket may alternatively be attached to the shaft of a gear motor 52 for driving the machine screw 40 into or out of the nut 44 attached to the frame or chassis 12 of the planter 10 to lower or raise the coulter discs 20, 22 in relation to the planter 10. The gear motor 52 is not shown in FIG. 2 but appears in FIGS. 3 and 4 to be described. In an alternate embodiment the jacking device may be an off-the-shelf type of machine screw actuator operable by hand with a wrench or motor driven as in the above example, either through a worm/worm gear drive or by a socket sized to fit the adjustment head 48 on the upper end of the machine screw actuator.

Figure 3:
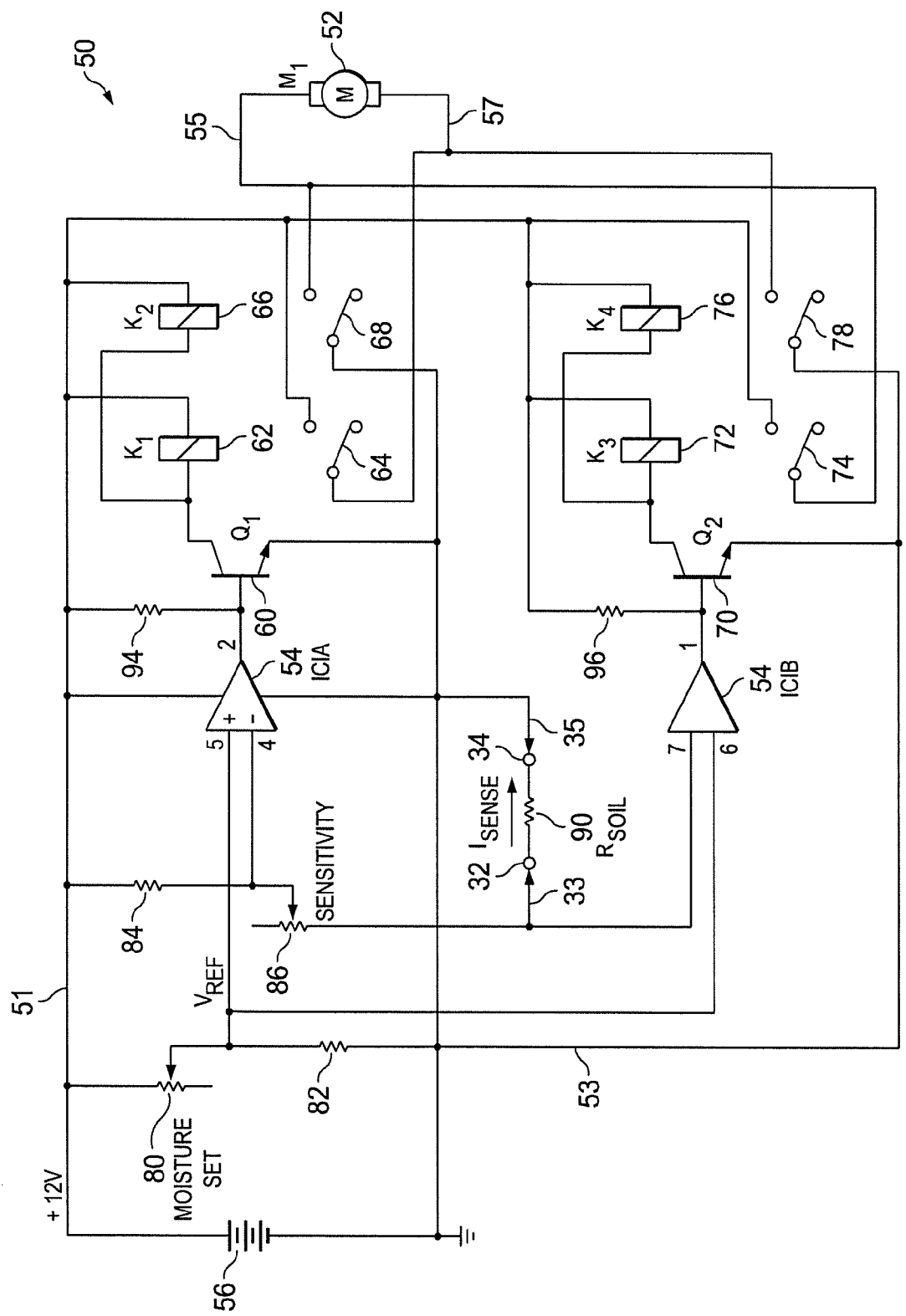
FIG. 3 illustrates a schematic diagram of a discrete analog sense circuit for controlling the mechanism of FIG. 2 of the present invention.

FIG. 3 illustrates a schematic diagram of a discrete analog sense circuit 50 for actuating the control mechanism of FIG. 2 of the present invention. In brief, a DC voltage supplied by battery 56 (+12 Volts in this example) is applied to the electrode leads 33 and 35 connected to the designated closing (or covering) discs 32, 34 of the planter 10. The voltage appearing at a sense terminal is input to the circuit 50 and compared with a reference voltage corresponding with the desired moisture content for the seed to be planted. The difference between these two voltages is converted to a drive signal to operate a relay circuit and drive an actuator to raise or lower the depth of cut of the coulter discs at the forward end of the planter.

The battery 56 is connected to the +line 51 of the circuit 50 and the line 53, which is designated as circuit ground. An integrated circuit 54 ("IC54") operates as a comparator to generate control signals fed to driver transistors 60 and 70. The transistors 60, 70 (Q1, Q2 respectively) energize relays 62, 66 and 72, 76 respectively to apply operating voltages through their contacts to a DC gear motor or actuator 52 vis leads 55 and 57. Relay 62 operates SPDT contacts 64, relay 66 operates SPDT contacts 68, relay 72 operates SPDT contacts 74, and relay 76 operates SPDT contacts 78 in this illustrative example. Relays 62, 66 (K1 and K2) cause the gear motor 52 to turn in one direction to raise the coulter discs attached to the control mechanism, jacking device 40. Relays 72, 76 (K3 and K4) cause the motor 52 to turn in the opposite direction to lower the coulter discs attached to the control mechanism, jacking device 40.

Continuing with FIG. 3, a desired moisture content is set and represented by the voltage $V_{ref}$ at the junction of potentiometer 80 ("Moisture Set") and resistor 82, which forms a "reference" voltage divider connected across the battery 56. The reference voltage $V_{ref}$ is applied to the +terminal of a first section IC1A of IC 54 and also to the −terminal of a second section IC1B of IC 54. The input signal from the electrode leads 33, 35 connected to the closing discs 32, 34 is connected to the junction of a second "input" voltage divider formed by resistor 84 and the soil resistance $R_{soil}$, which are connected across the battery 56. A sensitivity control is provided in this input voltage divider by potentiometer 86. The voltage that appears at the junction of the "input" voltage divider at the electrode 33 is applied to the −terminal of IC1A and the +terminal of IC1B. This voltage represents the current $I_{sense}$ that flows in the resistance $R_{soil}$. The current $I_{sense}$ is a function of the conductivity of the soil (which is proportional to the inverse of the soil resistivity as discussed above) and represents the moisture content of the soil at the location of the closing discs 32, 34.

In operation, if $I_{sense}$ is relatively high, indicating that the soil moisture content is high ($R_{soil}$ is relatively low), and the voltage applied to the input terminals of IC 54 falls below $V_{ref}$ then IC1A will output a control signal to Q1 60 to raise the coulter discs by connecting the +supply voltage to motor lead 57 and the −supply voltage to motor lead 55. Similarly, if $I_{sense}$ is relatively low, indicating that the soil moisture content is low ($R_{soil}$ is relatively high), and the voltage applied to the input terminals of IC 54 rises above $V_{ref}$ then IC1A will output a control signal to Q2 70 to lower the coulter discs by connecting the +supply voltage to motor lead 55 and the −supply voltage to motor lead 57. Thus, Q1 60 operates relays K1 62 and K2 66 to raise the coulter discs 20, 22 in response to a moisture content measured at the closing discs 32, 34 that is above the "moisture set" reference selected by the adjustment setting of potentiometer 80. Similarly, Q2 70 operates relays K3 72 and K4 76 to lower the coulter discs 20, 22 in response to a moisture content measured at the closing discs 32, 34 that is below the "moisture set" reference selected by the adjustment setting of potentiometer 80.

Figure 4:
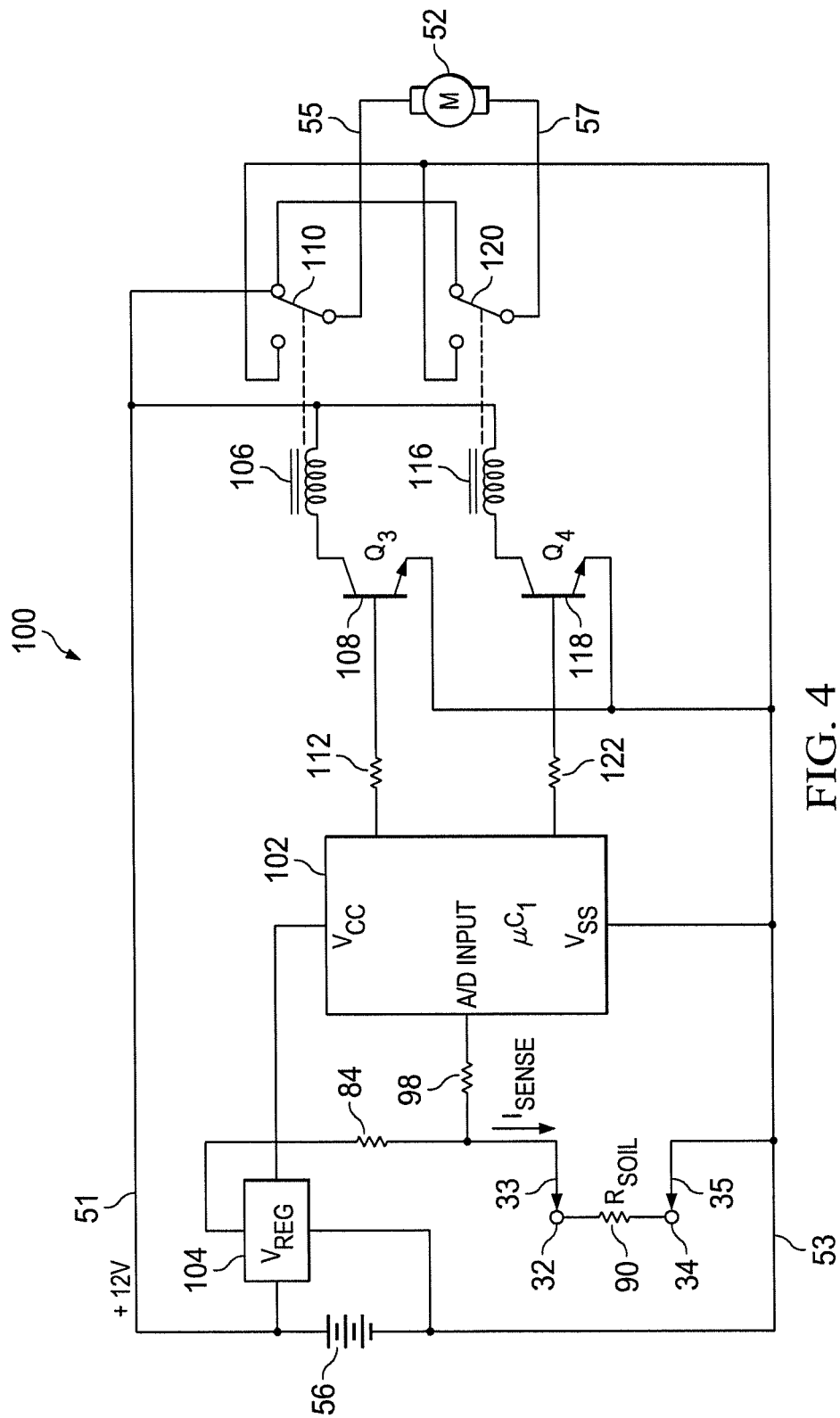
FIG. 4 illustrates a schematic diagram of an alternate circuit to the sense circuit of FIG. 3 that is based on a programmed microcontroller.

FIG. 4 illustrates a schematic diagram of a simplified alternate sense or sensing circuit 100 to the sensing circuit of FIG. 3. The circuit of FIG. 4 is based on a programmed microcontroller and performs essentially the same functions. The microcontroller, however, enables additional functions to be performed merely by installing programs for them as described below. Structures in FIG. 4 having the same reference numbers as appear in FIG. 3 refer to the same structures or structures having the same function. Microcontroller 102 ("uC 102") replaces the discrete analog circuit comprised of the IC1 54 and some of its input circuitry. A voltage regulator 104 supplies regulated voltages to the microcontroller 102 and the current sense voltage divider circuit comprised of resistor 84, the electrode leads 33, 35 connected to the closing discs 32, 34 and the resistance of the soil represented by $R_{soil}$. The voltage at the junction of the electrode lead 33 and the resistor 84 is applied to the input of an analog-to-digital converter ("A/D input") within the microcontroller 102 through resistor 98. The A/D convertor outputs a number that is compared with a stored value for the moisture setting (analogous to $V_{ref}$ in the circuit of FIG. 3) entered into the microcontroller by the user. The microcontroller 102 performs the comparison as described for the circuit of FIG. 3 and outputs corresponding control signals through the resistors 112 and 122 respectively to the driver transistors Q3 108 and Q4 118, which provide the drive current to energize respective relays 106, 116. The contacts 110, 120 of the relays 106, 116 connect the appropriate operating voltage to the DC motor or actuator 52 to raise or lower the cutting depth of the coulter discs 20, 22 in the same manner as described in the circuit of FIG. 3.

As persons skilled in the art understand, the functions that may be performed by the microcontroller sense circuit 100 are controlled by its operating programs. The microcontroller 102 can be a principal part of an operator's console or module, perhaps located in the cab of a tractor that pulls the planter along the rows of the field to be planted, or perhaps as part of a remote control unit carried and operated by a user of the system. The console or module (not shown) may be configured as a mobile or portable unit or installed as a fixed unit on the tractor. The console or module may communicate via a wired or a wireless link and include a display and controls for setting parameters such as seed type, planting depth, moisture content level, and the like. The display may be a touch-sensitive display to facilitate entry of commands and selected preferences for operating the planter. Such a console or module may further include a GPS navigation system and/or a receiver/transmitter to enable full remote control of planting operations. Further, the microcontroller 102 may be configured to stop the planter if an alarm condition arises during operation, as will be described below.

FIGS. 5A and 5B illustrate a flow chart for the operation of the embodiment of the invention depicted in FIGS. 1-4, which describes the process flow whenever the planter 10 is in operation (i.e., in motion) along a row or rows to be planted. The operational process 150 begins at the Start step 152 followed by a set-up step 154 to first associate the desired moisture content with the reference soil conductivity. This is done by setting a "Moisture Setting" control by adjusting the potentiometer 80 in the analog control circuit of FIG. 3. Alternatively, the setting may be entered from the console or module in the embodiment that employs a microcontroller 102, such as selecting one from a group of a range of settings or entering data corresponding to the desired selection. The initial setup may also include setting the depth that the ploughshare discs 24, 26 will prepare the furrow for the particular seed being planted.

The planter 10 may then begin its motion along a row or rows by pulling along with a tractor in step 156 so that the coulter discs 20, 22 can break up and loosen the soil. The loosened soil 38 is thus exposed to the depth corresponding to the measured soil conductivity in step 158. The soil conductivity measurement will be made at the closing discs 32, 34 when the "moisture setting" is entered to supply the reference for the sensor circuit 50 (or 100). The reference $V_{ref}$ Provides the baseline for generating the signal required to adjust the depth of the cuts made by the coulter discs 20, 22 as they loosen the soil in preparation to create the furrow in step 160. The depth of the coulter discs 20, 22 is regulated by the jacking device 40 according to drive signals supplied by the output of the sensor circuit 50 (or 100). The furrow created by the ploughshare discs 24, 26 will typically be a V-shaped trench-like cut into the soil surface. As the ploughshare discs 24, 26 create the furrow, the soil is evenly deposited to either side of the furrow to clear the furrow to receive seed form a seed dispenser 28. The seed dispenser 28 on the planter (not shown because it is obscured within the chassis of the planter 10 between the support wheels 16, 18 of the planter 10) then deposits a measured quantity of seed into the furrow as the planter 10 rolls along the furrow in the step 162. The seed dispenser 28 may include a hopper 30 for storing a bulk quantity of seed and a regulating mechanism (not shown) for metering the quantity of seed to be dispensed at each location along the furrow being planted. In FIG. 5A the flow advances to step 164 where the planted seed is covered by using the closing discs 32, 34 to push the moist soil excavated by the coulter discs 20, 22 into the furrow over the seeds.

Continuing with FIGS. 5A and 5B, the next few steps in the process 150 beginning with step 170 describe the process taking place in the sensor circuit 50 (or 100) while the planter 10 is in motion along the furrow being planted. It will be appreciated that, while the planter 10 is in motion, the actions of each part of the planter take place simultaneously, even though the steps are described in a sequence that corresponds to the arrangement of the parts of the planter 10 on its chassis 12. Some embodiments of the invention, depending on the particular planter configuration, may perform these steps in a sequence that differs from the illustrative one described herein. Moreover, when the analog sensor circuit of FIG. 3 is in use, the measurements occur continuously, updating the position of the jacking device that controls the adjustable depth of the coulter discs. Alternatively, when the microcontroller sensor circuit of FIG. 4 is in use, the measurements may be made in discrete intervals, updating the position of the jacking device in discrete steps, according to the way the operating program is structured.

In step 170 the sensor circuit 50 (100) measures the current between the closing discs 32, 34 whether they are both isolated (preferred when multiple-row planters are used) from earth potential (i.e., the chassis, which is at ground or earth potential) as in step 172 or whether one disc 32 is isolated from earth potential and the other closing disc 34 is not isolated from earth potential. When the non-isolated closing disc 34 is used as the negative (i.e., grounded) electrode 35, the connection of the electrode lead to the closing disc 34 as noted in step 174 is described in the description of FIGS. 8A and 8B below. In other embodiments, the negative electrode 35 may be another structural element of the planter chassis that is in contact with the earth.

In step 176 the voltage corresponding to the measurement of the current through $R_{soil}$ 90 is related or compared with the reference moisture setting represented by $V_{ref}$ at the inputs to the comparators in FIG. 3, or the A/D convertor input to the microcontroller 102 in FIG. 4. The comparison results in the generation of a control signal to adjust the depth of the coulter discs 20, 22 in step 178, followed by the output of control signals to the jacking device 40 to adjust the depth of the coulter discs 20, 22 in step 180. The control signals are defined in the steps following step 180, including step 190 that determines whether to increase of decrease the depth of the coulter discs 20, 22. If the soil is too dry per step 192, the depth is increased to a point where the moisture level is higher as indicated by the sensor circuit. If the soil is too moist per step 194, the depth is decreased to a point where the moisture level is lower as indicated by the sensor circuit. If the soil moisture level is correct per step 196, the depth is held at the point where the moisture level matches the moisture setting as indicated by the sensor circuit. The depth is held by sending equal and opposite control signals to the gear motor 52 or actuator of the jacking device 40, which will brake the motor or actuator so that the position of the coulter discs 20, 22 is held and not changed. The flow then advances to step 198 and the process sequence returns to step 156 and repeats the cycle.

Figure 6:
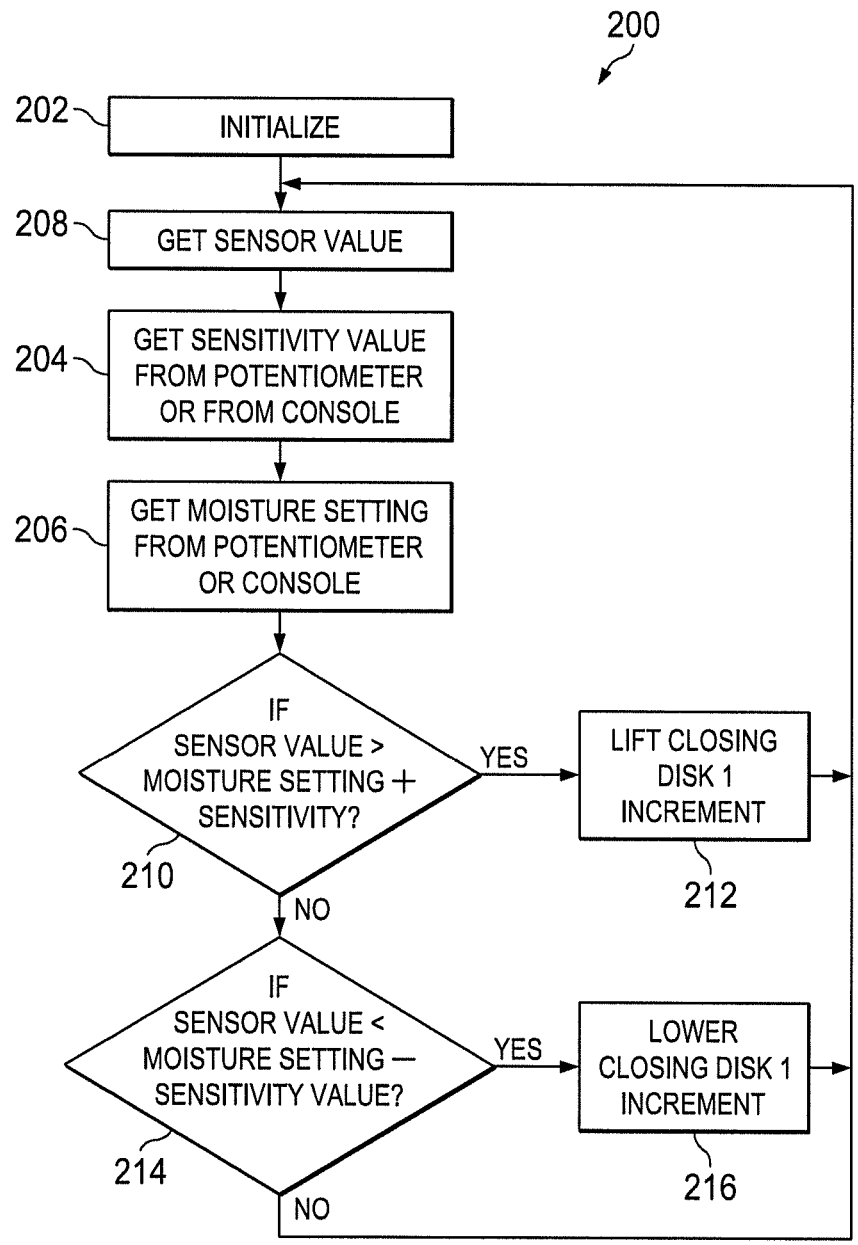
FIG. 6 illustrates a flow chart for a first portion of an operating program for the sense circuit depicted in FIG. 4.

FIG. 6 illustrates a flow chart for a first sequence 200 of an operating program in a microcontrolled planter system according to the present invention. The sequence 200 provides an alternate embodiment of the sensor circuit 100 depicted in FIG. 4 that regulates the depth of the coulter discs 20, 22 in response to the measured moisture level in the soil in contact with the closing discs 32, 34. This flow chart illustrates the sequence similar to the steps 154 and 170 through 194 shown in FIGS. 5A and 5B except the steps are performed by the microcontroller sensor circuit 100. The flow, after initializing at step 202 retrieves a sensitivity value in step 204 from a potentiometer setting or from a value stored in memory, and a moisture setting value in step 206, which may also be set by a potentiometer or from a value stored in memory. In step 208, the process retrieves the measurement corresponding to the soil conductivity and applies it to a comparison process in step 208. Subsequently, two tests are performed on the data. In step 210, if the sensor value from the measurement exceeds the sum of the moisture setting and sensitivity values, the process outputs a signal in step 212 to raise or lift the closing discs 32, 34 by one increment. If the sensor value does not exceed the required sum, the flow advances to step 214 to determine if the sensor value from the measurement is less than the moisture setting minus the sensitivity value, the process outputs a signal in step 216 to lower the closing discs 32, 34 by one increment. If the inequality in step 214 is not satisfied, the flow returns to repeat the process at step 204. The process runs as long as the sensor circuit is initialized, the planter is in motion, and the user has entered a resume or similar command from a console or module unit or by remote control.

Figure 7:
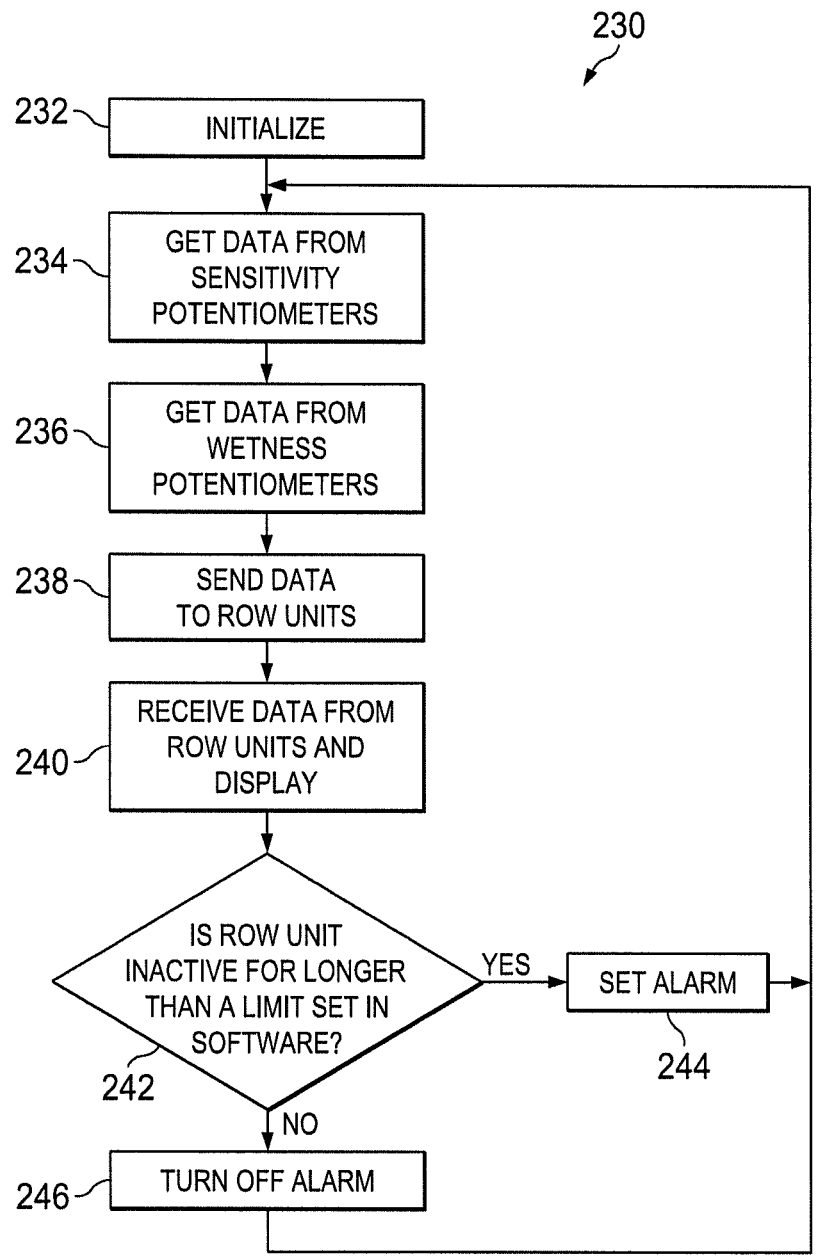
FIG. 7 illustrates a flow chart for a second portion of the operating program for the sense circuit depicted in FIG. 4.

FIG. 7 illustrates a flow chart for a second sequence 230 of an operating program in a microcontrolled planter system according to the present invention. In a typical application a planter system may include a multi-row implement capable of dispensing seed in eight rows simultaneously as in this example. The sequence 230 provides control functions for displaying sensor data during operation and to respond to a malfunction and emit an alarm signal to call attention to a malfunction in the operation of the planter system. Examples of such malfunctions include broken wires or other connections to the closing discs, a worn contact assembly 37 or contact spring 382 (See FIGS. 8A and 8B), failure of electrical isolation (See FIGS. 9A and 9B) between the isolated disc 32 and the frame 402, a short circuit occurs between the closing discs (as when metallic debris might be encountered, or a broken disc unit, and the like.

The process in FIG. 7 begins with initializing the system at step 232 followed by retrieving data from the sensitivity potentiometers for all of the eight rows in step 234, then the moisture setting values for each row in step 236. This data may then be sent to the individual row units to set the parameters for the operation of the planter 10 for each row in step 238. In step 240, the data from each of the row units may be retrieved and displayed on a display in the console or module. this data may be processed any number of ways, depending on the situation, by using application programs adapted to the particular purpose, as is well known in the art. One possible application is to monitor and analyze the data for errors or malfunction such as depicted in step 242. Step 242 determines if a malfunction is imminent or has occurred by monitoring how long a period the planter has been inactive. If the period of inactivity exceeds a preset limit an alarm is set in step 244. If the period of inactivity is less than the preset limit, the process advances to step 246 and the alarm is turned off or reset and the flow returns to the beginning and repeats until the planter system stops use and is turned off before the alarm is set.

The processes illustrated in FIGS. 6 and 7 are just two of many possible operating application programs that can be programmed into the microcontroller. Others may include averaging routines to compute running averages (for, e.g., stabilizing the measurement data to provide smooth response), monitor dynamic changes in the moisture levels for recording as planting and yield data or to detect whether the planter is in motion, is lifted form the surface, or to stop an adjustment of the coulter discs when they are at the correct depth. The microcontroller could also be configured to manage remote wireless control of the planter system and the control according to the data from the sensor circuit, including controlling and tracking of the movement of the planter using a GPS navigation system.

FIGS. 8A and 8B illustrate first 300 and second 350 embodiments respectively of coupling mechanisms for connecting the electrode leads of the sense circuit of FIG. 3 or 4 to discs of the planter implement of FIGS. 1 and 2. The concept used in each embodiment is to provide a consistent and reliable electrical contact between a rotating disc on the planter and its axle. In both embodiments 300, 350 the disc 366 is mounted on a hub 352 that is supported on the axle 354 by a bearing 356. The disc 366, which is in this example a closing disc, rotates about the axle 354 on the bearing 356. An array of machine screws 360 (there may typically be four to eight such screws 360 for each disc-to-hub connection) may be disposed in a circular bolt pattern around the hub 356. The axle 354 for either disc 32, 34 in this example, which does not rotate, may be supported by the chassis 12 of the planter 10. The bearing 356 may be a ball bearing of the type for supporting vehicular wheels, for example. As is known, the electrical contact through such a bearing 356 may be unreliable; hence there is a need to ensure electrical conductivity through the bearing structure. The electrical leads may be connected to the axle 354 of each disc as described in FIGS. 9A and 9B. The axle 354 for one of the discs 32 is electrically isolated from the chassis to provide the active or isolated connection to the sensor circuit. The axle 354 for the non-isolated disc 34 on the ground-side of the sensor circuit may be connected to the chassis to provide the passive or non-isolated connection to the sensor circuit. Note that the structures described in this paragraph are common to both embodiments 300, 350. Further, whether a closing disc is isolated or not depends on whether the axle that supports the disc is isolated from the chassis or not.

Continuing with FIG. 8A, the hub cap 358 includes a spring-loaded contact assembly 370 disposed in the center of the hub cap 358 in alignment with the axis of the axle 354. The contact assembly 370 is hollow, having an axial bore open at the axle end of the contact assembly 370. Included within the contact assembly 370 is an electrical contact pin 372 that is held in position by a helical spring 374 disposed within the contact assembly 370 between an internal end of the contact pin 372 and the closed end of the axial bore. Thus, under the urging of the helical spring 374, the contact pin is pressed against the end of the axle 354 as shown in FIG. 8A. The hub cap 358, contact assembly 370, helical spring 374, contact pin 372, and the axle 354 are all made of electrically conductive materials. Therefore, electrical contact is maintained from the closing disc 366 through the hub cap 358 and the contact assembly 370, its internal helical spring 374 and contact pin 372 to the axle 354. To ensure reliability of this system of contacts, the hub cap 358 may be filled with conductive grease 380.

Continuing with FIG. 8B, the hub cap 378 includes a simpler internal contact structure than the embodiment of FIG. 8A. In FIG. 8B the internal, U-shaped leaf spring 382 provides electrical contact between the interior surface of the hub cap 378 and the proximate end of the axle 354. Conductive grease 380 may also be used to ensure the reliability of the contact configuration 350 of FIG. 8B.

Figure 9A:
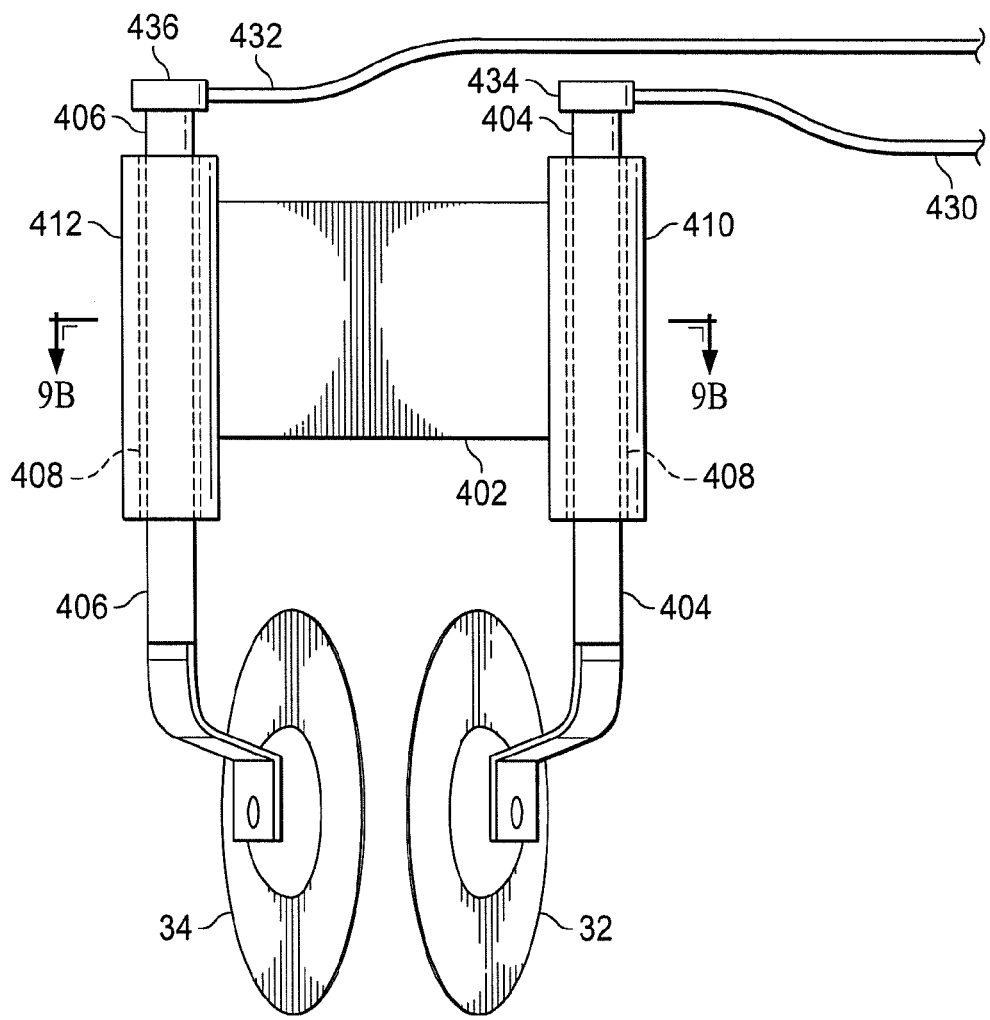
FIG. 9A illustrates a simplified view of the closing discs of a planter in the embodiment of FIG. 1, viewed from the rear.
Figure 9B:
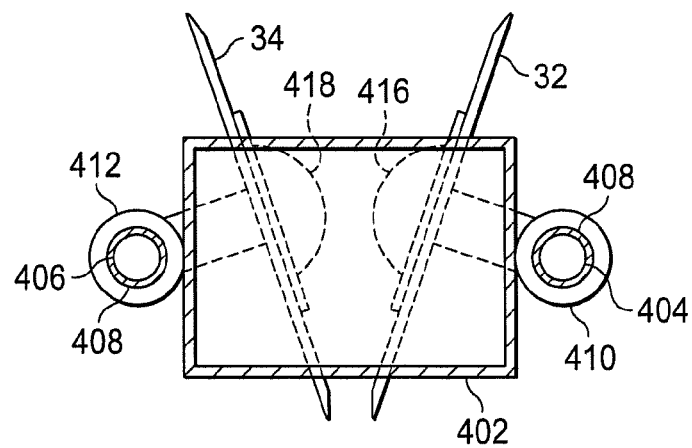
FIG. 9B illustrates a cross section of the closing disc structure of FIG. 8A viewed from above.

FIGS. 9A and 9B depict one example of a covering member assembly, identified in this example as the closing discs 32, 34 and the supporting structures thereof. The example illustrated in FIGS. 9A and 9B depict the preferred embodiment when multiple-row planter systems are used. FIG. 9A illustrates a simplified view of a portion of the planter 10 that supports the closing discs 32, 34 of FIG. 1, viewed from the rear, and FIG. 9B illustrates a cross section of the closing disc structure of FIG. 9A viewed from above. It will be noted that the spindles 404, 406 that support the isolated discs 32, 34 are electrically insulated from the frame or chassis 12 of the planter 10 by insulated bushings 408 shown in FIGS. 9A and 9B. The insulated bushing 408 may conceptually be provided by a bushing made of synthetic material such as Nylon or Teflon and disposed within the spindle tubes 410, 412 or by a more complex, insulating bearing structure well-known in the art. In single-row planters, the spindle 406 for a non-isolated closing disc 34 may be conventionally supported in a metallic bushing bearing (not shown) disposed in the spindle tube 412. In some embodiments, the spindles 404, 406 may be fixed within the spindle tubes 410, 412 and not permitted to rotate. The spindle tubes 410, 412 may be attached to the coulter frame 402.

Continuing with FIG. 9A, a coulter frame 402 supports an isolated spindle 404 in a first spindle tube 410 and a non-insulated spindle 406 in a second spindle tube 412. Sub-frame 402 for supporting the closing disc structure is attached to and is part of the frame or chassis 12 of the planter 10. The first and second spindle tubes 410, 412 are attached to the sub-frame 402. Spindle 404 is isolated from first spindle tube 410 by an insulated bushing 408 that provides electrical insulation of the spindle 404 from the first spindle tube 410. A closing disc 32 is attached to the spindle 404. The spindle 404 is attached to closing disc 32 by a conductive mechanism such as shown in FIG. 8A or 8B. The spindle 406 is attached to closing disc 34 by a similar conductive mechanism such as FIG. 8B. Attached to an upper end of spindle 404 is a terminal 434 that attaches a signal lead 430 from the positive terminal 33 of the sensor circuit 50 or 100. Attached to an upper end of spindle 406 is a terminal 436 that attaches a signal lead 432 from the negative terminal 35 of the sensor circuit 50 or 100.

Continuing with FIG. 9B, which depicts the same structure as FIG. 9A but from a top view looking downward to show, in phantom, the first and second hub caps 416, 418 covering the bearing and contact mechanisms for the isolated 32 and non-insulated 34 closing discs. Other reference numbers identify the same structures as in FIG. 9A.

Several alternate ways to connect the control circuit to measure the soil conductivity are possible. For example the electrode leads may be connected either between both closing discs 32, 34, one of which is isolated, or between one isolated closing disc and the frame or chassis 12 of the planter. It is even possible to connect the electrode leads to the coulter discs 20, 22 because of the correlation of the moisture content in the soil at the coulter discs 20, 22 with the needed moisture in the soil that will be used to fill in the furrow after the seed is planted. However, in the planter selected for this example, the closing (or covering) discs 32, 34 are more conveniently used as electrodes of the sensing circuit because it is easier to isolate them from the chassis or frame 12 of the planter 10.

In multiple-row planters, to minimize interaction of soil conductivity measured in one row from affecting the soil conductivity measured in an adjacent row it is recommended to isolate both discs that are used as electrodes from the chassis of the planter. In addition, to improve the accuracy of the sensed current measurement, a differential amplifier, well-known to persons skilled in the art and having each input coupled to an isolated disc electrode may be added to the input of the analog (FIG. 3) or microcontroller (FIG. 4) sensing circuit.

The planter implement described herein is but one example and is not intended to limit the scope of the invention. Other types or forms of planting implements may be adapted using the principles illustrated herein and set forth in the appended claims. In some alternative planter embodiments, using other pairs of discs is simply a matter of tooling the planter design accordingly. In another planter embodiment having only a single coulter disc, the ground connection to the soil may essentially be inherent through the chassis because of the number of other structures of the planter that are in metallic contact with the soil. However, such a configuration might yield a less direct soil moisture or conductivity value because the soil in contact with the electrodes is less likely to be the same as the soil that will be used to cover the seeds. Thus, the selection of which components of the planter to use as electrodes is mainly a matter of (a) ability to isolate the component from ground; (b) the proximity of the component to the soil that will be used for covering the seeds; and (c) the accessibility of the component to connection of the electrode leads.

While the invention has been shown in only one of its forms, it is not thus limited but is susceptible to various changes and modifications without departing from the spirit thereof.

What is claimed is:

1. During operation of a planter implement having at least one coulter disc, an adjustable ploughshare, a seed dispensing device, and first and second furrow closing discs disposed along a common chassis, an improved process for covering seed with soil having a set moisture content, comprising the steps of:

associating a soil moisture content setting for germinating seed with a reference soil conductivity;

loosening soil to an adjustable depth with said at least one coulter disc to provide exposed soil for planting seed;

creating a furrow to a preset planting depth with said ploughshare and planting said seed in said furrow;

measuring the conductivity of said soil between said first and second furrow closing discs;

controlling said adjustable depth corresponding to said reference soil conductivity; and covering seed planted in said furrow with exposed soil from said loosening step having said set moisture content.

2. The process of claim 1, wherein the step of loosening soil comprises the step of:
pulling said coulter along the surface of said soil such that said coulter cuts into said soil to said adjustable depth, cutting and loosening said soil.

3. The process of claim 1, wherein the steps of creating a furrow comprises the step of:
forming a furrow in said exposed soil.

4. The process of claim 1, wherein the planting and covering steps comprise the steps of:
depositing at least one seed in said furrow; and
closing said furrow using said first and second furrow closing discs with soil exposed during said loosening step.

5. The process of claim 1, wherein the step of measuring comprises the steps of:
isolating at least one of said first and second furrow closing discs from said chassis;
connecting a current sensing circuit coupled between each of said closing discs to measure soil conductivity; and
setting said reference soil conductivity value corresponding to said soil moisture content setting to enable said sensing circuit to develop a control output.

6. The process of claim 5, wherein the step of setting comprises:
setting a potentiometer in said current sensing circuit to said soil moisture setting according to local conditions including at least one of variety of seed, type of soil, and recommended planting time.

7. The process of claim 1, wherein the step of controlling comprises the step of:
sending a control output signal to an actuator to raise said coulter disc or discs if said soil conductivity is greater than said reference setting and lower said coulter disc or discs if said soil conductivity is less than said reference setting or applying a brake signal to the actuator to maintain the height of said coulter disc or discs if said soil conductivity is substantially equal to said reference setting.

8. Apparatus for covering seed dispensed into a furrow with soil selected according to a soil moisture content setting for germination, comprising:
a planter chassis;
a coulter adjustable to excavate a soil surface along a path to a depth corresponding to a soil moisture setting and depositing said excavated soil adjacent said path;
a ploughshare for forming a furrow in said soil surface to a preset depth appropriate to the seed to be dispensed;
a control circuit responsive to said soil moisture setting for adjusting said coulter to said depth; and
a covering member assembly for urging soil excavated by said coulter and having a soil moisture content approximately equal to said soil moisture content setting over said seed; wherein said coulter, control circuit, and covering member assembly are supported by said planter chassis.

9. The apparatus of claim 8, further comprising:
an actuator coupled to said coulter to adjust said coulter responsive to at least one control signal output by said control circuit.

10. The apparatus of claim 9, wherein said actuator is a gear motor controlled by said at least one control signal from said control circuit.

11. The apparatus of claim 8, wherein said coulter comprises at least one coulter disc for excavating said soil.

12. The apparatus of claim 8, wherein said control circuit comprises:
first and second electrodes coupled to first and second inputs of a comparator, said comparator generating an output signal proportional to a difference between either of said first and second inputs and a reference corresponding with said soil moisture content setting.

13. The apparatus of claim 12, wherein said control circuit comprises:
a drive circuit for adjusting said coulter to said depth responsive to said output signal from said comparator.

14. The apparatus of claim 8, wherein said control circuit comprises:
first and second electrodes coupled to first and second inputs of a microcontroller, said microcontroller having an A/D convertor for processing said inputs and a comparison mechanism for generating an output signal proportional to a difference between either of said first and second inputs and a reference corresponding with said soil moisture content setting.

15. The apparatus of claim 14, wherein said control circuit comprises:
a drive circuit for adjusting said coulter to said depth responsive to said output signal from said microcontroller.

16. The apparatus of claim 8, wherein said covering member assembly comprises:
an assembly of first and second covering discs disposed in a fixed, following relationship with said coulter.

17. The apparatus of claim 16, wherein:
said first and second covering discs are respectively connected to first and second inputs of said control circuit, to function respectively as first and second soil moisture electrodes.

18. The apparatus of claim 8, wherein said covering member assembly comprises:
an assembly of first and second covering discs disposed in a fixed, following relationship with said coulter; and
at least one of said first and second covering discs is electrically isolated from said planter chassis.

19. The apparatus of claim 8, wherein:
said first and second covering discs are respectively connected to first and second inputs of said control circuit, to function respectively as first and second soil moisture electrodes.

* * * * *